(12) United States Patent
Heusler et al.

(10) Patent No.: US 10,651,615 B2
(45) Date of Patent: May 12, 2020

(54) CONTACT RAIL DEVICE FOR AN AT LEAST PARTLY ELECTRICALLY DRIVEN MOTOR VEHICLE

(71) Applicant: Dr. Ing. h.c. F. Porsche Aktiengesellschaft, Stuttgart (DE)

(72) Inventors: Pascal Heusler, Stuttgart (DE); Naser Abu Daqqa, Vaihingen an der Enz (DE); Rainer Bautz, Nufringen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/025,111

(22) Filed: Jul. 2, 2018

(65) Prior Publication Data

US 2019/0013631 A1 Jan. 10, 2019

(30) Foreign Application Priority Data

Jul. 6, 2017 (DE) .......................... 10 2017 115137

(51) Int. Cl.
| | |
|---|---|
| *H01R 13/56* | (2006.01) |
| *H01R 25/16* | (2006.01) |
| *B60R 16/02* | (2006.01) |
| *H01R 4/30* | (2006.01) |
| *H02G 5/00* | (2006.01) |
| *H01R 105/00* | (2006.01) |

(52) U.S. Cl.
CPC ....... *H01R 25/162* (2013.01); *B60R 16/0215* (2013.01); *H01R 4/30* (2013.01); *H01R 2105/00* (2013.01); *H01R 2201/26* (2013.01); *H02G 5/002* (2013.01)

(58) Field of Classification Search
CPC ...... H01R 25/006; H01R 13/562; H02G 5/08; H02G 5/005; H02G 15/08; H02G 15/013; H02G 15/18; B60R 16/0215
USPC ............. 439/211, 212, 445; 174/72 A, 72 B, 174/72 R, 74 R, 88 R
See application file for complete search history.

(56) References Cited

U.S. PATENT DOCUMENTS

| | | | |
|---|---|---|---|
| 6,903,275 B1 * | 6/2005 | Jetton | ................. B60R 16/0215 174/503 |
| 7,722,362 B2 * | 5/2010 | Frake | ...................... B29C 43/18 439/76.1 |
| 7,819,707 B2 | 10/2010 | Aoki et al. | |

(Continued)

FOREIGN PATENT DOCUMENTS

| | | |
|---|---|---|
| CN | 103081029 A | 5/2013 |
| DE | 202009009607 U1 | 9/2009 |

(Continued)

OTHER PUBLICATIONS

German Search Report for German Application No. 10 2017 115 137.0, dated May 2, 2018, with partial translation—6 pages.

(Continued)

*Primary Examiner* — Thanh Tam T Le

(74) *Attorney, Agent, or Firm* — RatnerPrestia

(57) ABSTRACT

A contact rail device for an at least partly electrically driven motor vehicle. The contact rail device comprises at least one busbar for electrical contact-connection of an electric machine to a supply device for the electric machine In this case, the busbar comprises at least one compensation bow for compensation of temperature-dependent changes in length.

9 Claims, 1 Drawing Sheet

(56) References Cited

U.S. PATENT DOCUMENTS

| | | | |
|---|---|---|---|
| 8,480,419 B2* | 7/2013 | Holbrook | B60R 25/00 174/72 B |
| 8,574,008 B2* | 11/2013 | Gro.beta.e | H01M 2/202 439/627 |
| 8,625,256 B2* | 1/2014 | Schmid | H02B 1/20 174/70 B |
| 8,794,994 B2* | 8/2014 | Kollmann | H01R 13/62977 439/441 |
| 8,829,346 B2* | 9/2014 | Robinson | H02B 1/056 174/129 B |
| 8,859,897 B2* | 10/2014 | Hadi | H02G 5/005 174/68.2 |
| 9,012,777 B2* | 4/2015 | Adachi | B60K 28/14 174/88 R |
| 9,105,949 B2 | 8/2015 | Diez et al. | |
| 9,192,081 B2* | 11/2015 | Adachi | H02G 3/0487 |
| 9,397,328 B2* | 7/2016 | Chorian | H01M 2/206 |
| 9,413,082 B2* | 8/2016 | Gassauer | H01R 4/4836 |
| 9,524,811 B2* | 12/2016 | Adachi | H01B 7/0045 |
| 9,947,435 B2* | 4/2018 | Oka | B60R 16/0215 |
| 10,096,946 B2* | 10/2018 | Iizuka | B60R 16/0207 |
| 2008/0026610 A1 | 1/2008 | Frake et al. | |
| 2013/0140055 A1 | 6/2013 | Adachi et al. | |
| 2013/0153294 A1 | 6/2013 | Adachi et al. | |

FOREIGN PATENT DOCUMENTS

| | | |
|---|---|---|
| DE | 102010031380 A1 | 1/2012 |
| EP | 2610878 A1 | 7/2013 |
| JP | 567220 U | 1/1981 |
| JP | H0755877 A | 3/1995 |
| JP | 2006261100 A | 9/2006 |
| JP | 2010108702 A | 5/2010 |
| KR | 20150033539 A | 4/2015 |
| WO | 2008098193 A2 | 8/2008 |
| WO | 2017018278 A1 | 2/2017 |

OTHER PUBLICATIONS

Korean Office Action for Korean Application No. 10-2018-0076221, dated Jul. 22, 2019, 2 pages.

Notification of Reason for Rejection for Japanese Application No. 2018-127954, dated Jul. 30, 2019, 4 pages.

Chinese Office Action for Chinese Application No. 201810706792.2, dated Jul. 3, 2019, 8 pages.

Korean Office Action for Korean Application No. 10-2018-0076221, dated Jan. 17, 2020, 4 pages.

Japanese Decision of Refusal for Japanese Application No. 2018-127954, dated Feb. 25, 2020, 2 pages.

\* cited by examiner

CONTACT RAIL DEVICE FOR AN AT LEAST PARTLY ELECTRICALLY DRIVEN MOTOR VEHICLE

CROSS-REFERENCE TO RELATED APPLICATION

This application claims priority to German Patent Application No. DE 10 2017 115 137.0, filed Jul. 6, 2017, which is incorporated by reference herein in its entirety.

FIELD OF THE INVENTION

The present invention relates to a contact rail device for an at least partly electrically driven motor vehicle. The contact rail device comprises at least one busbar for electrical contact-connection of at least one electric machine to at least one supply device for the electric machine.

BACKGROUND OF THE INVENTION

In electric or hybrid vehicles, so-called busbars are frequently used for the contact-connection between the electric machine and an upstream inverter or inverter element. Such busbars, as they are often denoted, are formed, for example, as copper rails or copper pieces.

A disadvantage thereof is that the busbars generally expand and/or contract under the influence of temperature. As a result, the busbars exert a mechanical force on the machine and the upstream inverter.

The prior art has therefore disclosed busbars that are configured as very extensively slotted copper rails. However, such busbars are very costly.

SUMMARY OF THE INVENTION

It is therefore the object of the present invention to provide a particularly cost-effective and at the same time reliable electrical contact-connection between an electric machine and a supply device for the electric machine.

Said object is achieved by means of a contact rail device for an at least partly electrically driven motor vehicle having at least one busbar for electrical contact-connection of at least one electric machine to at least one supply device for the electric machine, wherein the busbar comprises at least one compensation bow for compensation of temperature-dependent changes in length. A motor vehicle according to aspects of the invention which is at least partly electrically driven, comprising at least one electric machine and at least one supply device for the electric machine and at least one contact rail device having at least one busbar for electrical contact-connection of the electric machine to the supply device, characterized in that the busbar comprises at least one compensation bow for compensation of temperature-dependent changes in length. The subclaims relate to preferred refinements. Further advantages and features of the present invention will emerge from the general description and from the description of the exemplary embodiments.

The contact rail device according to aspects of the invention is suitable and designed for an at least partly electrically driven motor vehicle. The contact rail device comprises at least one busbar for electrical contact-connection of at least one electric machine to at least one supply device for the electric machine. In this case, the busbar comprises at least one compensation bow for compensation of temperature-dependent changes in length.

The contact rail device according to aspects of the invention offers numerous advantages. The busbar with the compensation bow offers a considerable advantage. The mechanical forces arising under the influence of temperature can be significantly reduced or compensated thereby. Such a compensation bow can also be implemented in a particularly inexpensive manner. As a result, such a busbar is very cost-effective and economically viable. A further advantage is that the compensation bow does not exert an unfavorable influence on the stability or robustness of the busbar. Such a busbar is therefore particularly reliable and also functions very dependably over longer operating periods of a motor vehicle.

The compensation bow is preferably formed in an S-shape. This makes it possible to reduce the mechanical forces arising in a particularly effective manner. In particular, the compensation bow is formed as an S-bow or comprises at least one such S-bow. To that end, the compensation bow may have, for example, at least two C-bows strung together directly or indirectly in the opposite orientation. The compensation bow can also be formed in a U-shape and/or Z-shape and/or T-shape. Other bow geometries suitable for reducing mechanical forces are also possible.

It is possible for the compensation bow to have at least one additional geometry for reinforcement and/or stabilization. For example, the compensation bow can comprise at least one stamped portion and/or folded edge and/or bead or the like. For example, the additional geometry is arranged between two C-shaped bows of a compensation bow formed in an S-shape.

The busbar and the compensation bow are particularly preferably formed in one piece. In particular, the busbar and the compensation bow consist of the same material and are formed as one piece of material. Such a busbar is particularly cost-effective and at the same time particularly robust. However, it is also possible for the busbar and the compensation bow to be provided by at least one separate component respectively.

It is possible for the compensation bow to be produced by at least one bending process. Such production can be implemented in a particularly economically viable manner. In particular, the busbar is bent at least once in order to produce the compensation bow. Preferably, the busbar is bent several times. Other suitable deformation processes for producing the compensation bow are also possible. For example, a drawing process and/or a stamping process or the like can be provided.

It is particularly preferable for the busbar to be manufactured from copper. It is likewise preferable for the busbar to be manufactured from a copper alloy. This affords a particularly conductive electrical contact-connection. In particular, the compensation bow is also manufactured from copper or a copper alloy. The busbar and/or the compensation bow can also be manufactured from another metal with a correspondingly good conductivity. The busbar and/or the compensation bow can also be manufactured from another metal alloy.

In all of the configurations, it is particularly preferable for the busbar to be of solid form. Such a busbar can be furnished with the compensation bow and, for example, bent in a particularly inexpensive manner. Such a busbar is also electrically very resilient. In particular, the busbar is provided by at least one solid component. For example, the busbar is provided by a solid rail and/or a solid rod. Other profile structures are also possible. In particular, the compensation bow is also of solid form. The busbar is particularly preferably a solid copper part formed in one piece with the compensation bow. It is also possible for the busbar and/or the compensation bow to be of partly solid form.

The supply device can comprise at least one inverter device or be formed as such. The inverter device comprises, in particular, at least one inverter and/or at least one inverter element. In particular, the electric machine is electrically connected to the inverter device by means of the contact rail device. The contact rail device according to aspects of the invention can be used particularly advantageously for such contact-connection. In particular, the busbar provides an electrical contact-connection between the electric machine and at least one inverter and/or at least one inverter element. The inverter device is connected, in particular, to at least one electrical energy store and preferably to a traction battery.

In one advantageous configuration, the contact rail device comprises at least three busbars. In particular, the busbars each provide an electrical contact-connection for each phase of the electric machine. This makes it possible to connect an AC machine to an inverter device in a particularly advantageous manner. To this end, the electric machine is formed, for example, as a three-phase AC machine.

The busbars also have in each case at least one compensation bow. The busbars can also be furnished with different or identical compensation bows. It is possible for the busbars to also be formed with different lengths. The busbars can also be formed with substantially the same length. The contact rail device can also comprise four or more or even just two busbars.

It is possible for the busbar to comprise at least two compensation bows. The busbar can also comprise a plurality of compensation bows. For example, the busbar comprises two or more S-shaped compensation bows. The busbar can also comprise two or more U-shaped and/or Z-shaped and/or C-shaped compensation bows. In this case, the compensation bows can have the same orientation and/or be arranged with an alternating orientation.

In particular, the number and/or geometry of the compensation bows is adapted to a longitudinal extent under the operating temperatures to be expected.

The busbar is particularly preferably formed as a high-voltage line.

The contact rail device preferably comprises at least one electrical connection device for connecting the busbar to the electric machine and/or to the supply device. The electrical connection device can also be formed to connect the busbar to at least one further busbar and/or bus and/or distributor rail and/or another suitable contact rail. The contact rail device can comprise at least one bus and/or distributor rail and/or another rail device provided for contact-connection.

The electric machine is formed, in particular, as an electric motor or comprises at least one such electric motor. The electric machine is provided, in particular, for a drive of a motor vehicle. The electric machine may also be able to be implemented as a generator, for example for recuperation. The electric machine can also be formed as a generator or comprise at least one such generator.

The motor vehicle according to aspects of the invention is at least partly electrically driven. The motor vehicle comprises at least one electric machine and at least one supply device for the electric machine. The motor vehicle comprises at least one busbar for electrical contact-connection of the electric machine to the supply device. In this case, the busbar comprises at least one compensation bow for compensation of temperature-dependent changes in length.

The motor vehicle according to aspects of the invention also offers numerous advantages. The motor vehicle according to aspects of the invention provides a cost-effective and reliable electric drive.

The motor vehicle according to aspects of the invention comprises, in particular, a contact rail device, as has been described above.

The motor vehicle is formed, in particular, as an electric vehicle and/or as a hybrid vehicle. The electric machine serves here, in particular, as a drive for the motor vehicle. In particular, the supply device, preferably the inverter device, is arranged at the electric machine and, in particular, secured thereto. As an alternative or in addition, the supply device can also be secured elsewhere.

BRIEF DESCRIPTION OF THE DRAWINGS

Further advantages and features of the present invention emerge from the exemplary embodiment, which is discussed below with reference to the appended figure.

In the figures.

DETAILED DESCRIPTION OF THE INVENTION

Figure 1:
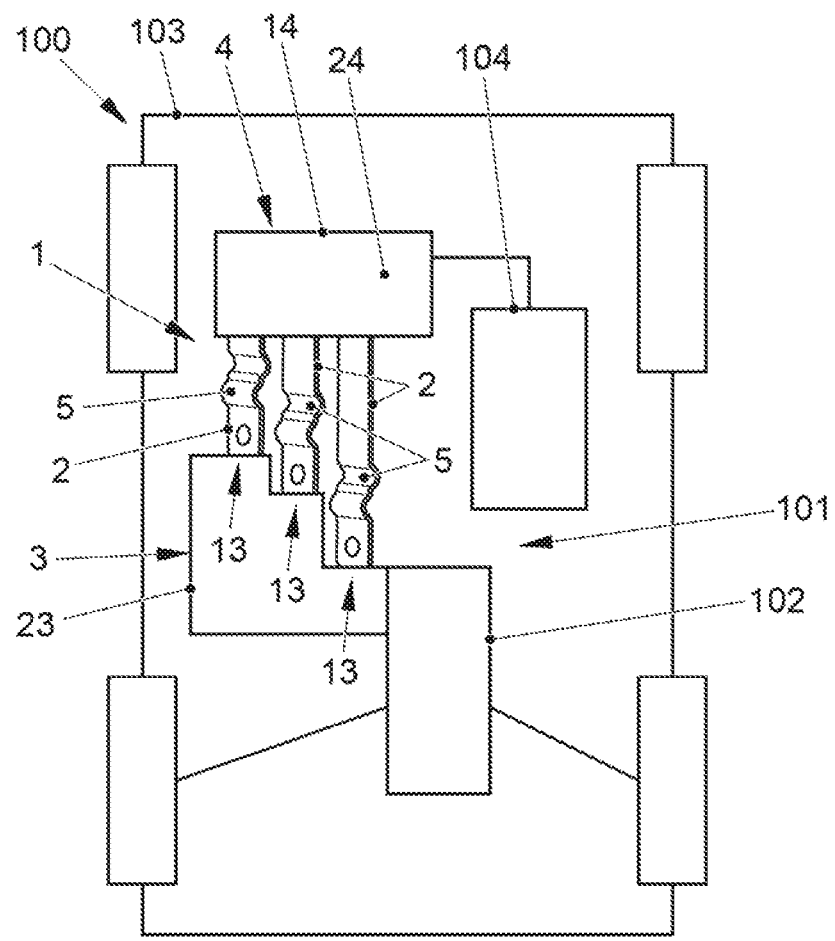
FIG. 1 shows a highly schematic diagram of a motor vehicle having a contact rail device according to aspects of the invention.

FIG. 1 shows a contact rail device 1 according to aspects of the invention, which in this case is used in a motor vehicle 100 formed as an electric vehicle 103.

The contact rail device 1 in this case comprises three busbars 2. The busbars 2 shown here are not true to scale and are illustrated in very highly enlarged fashion for the purpose of better illustration. The busbars 2 serve in each case as a high-voltage line 12 for contact-connection of an electric machine 3 to a supply device 4.

The electric machine 3 is in this case formed as an electric motor 23, which serves as a drive 101 of the electric vehicle 103. In this case, a transmission device 102 is connected downstream of the electric motor 23. An electrical energy store formed as a traction battery 104 is provided for the purpose of supplying energy to the drive 101.

The supply device 4 is in this case an inverter device 14, which has one or more inverter elements 24. The inverter device 14 serves here to convert a DC voltage supplied by a traction battery 104 to an AC voltage. The inverter device 14 is in this case secured to the electric machine.

In the configuration shown here, the electric machine 3 is formed, for example, as a three-phase AC machine. To this end, each phase 13 of the machine 3 is contact-connected to its own busbar 2. The busbars are contact-connected to corresponding connections of the inverter device 14.

Depending on the operating situation of the motor vehicle 100 or of the machine 3, the busbars 2 have different temperatures. The busbars 2 can expand and contract due to the influence of temperature. As a result, the busbars 2 exert a mechanical force on the contact-connected components. In order to reduce said mechanical force, the busbars 2 are in this case furnished with in each case one compensation bow 5. The compensation bow 5 is in this case formed as an S-bow 15.

Figure 2:
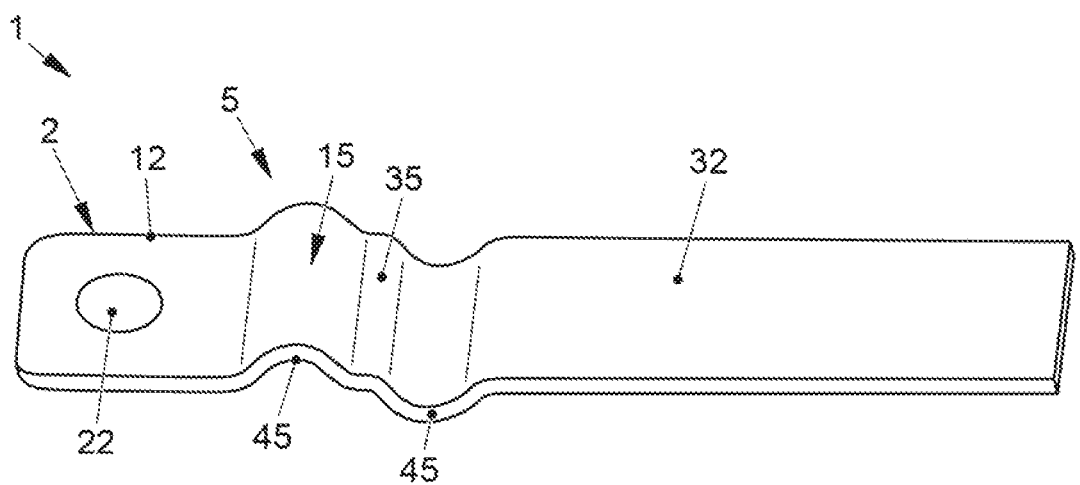
FIG. 2 shows a schematic perspective illustration of a contact rail device according to aspects of the invention from obliquely above.

FIG. 2 illustrates a busbar 2 of the contact rail device 1 according to aspects of the invention in more detail. In this case, the busbar 2 comprises a compensation bow 5 formed as an S-bow 15.

The busbar 2 is formed here as a solid copper part 32. The compensation bow 5 is in this case of the same piece of material as the solid copper part 32. To produce the compensation bow 5, the busbar 2 is deformed and, for example, bent by a corresponding deformation process, for example.

The S-bow 15 is in this case provided by two oppositely oriented C-bows 45. Between the C-bows 45, the compensation bow 5 is furnished here with an additional geometry 35. The additional geometry 35 is formed, for example, as a folded edge.

In this case, an electrical connection device 22 is provided at one end of the busbar 2. Said electrical connection device serves, for example, to connect the busbar 2 to the electric machine and/or to the supply device 4. The connection device 22 is in this case formed as a recess or a through-hole. Other types of connection devices 22 are also possible.

In the section of the busbar 2 shown here, the other end is not shown in any more detail. At least one connection device 22 can also be provided at this end.

What is claimed is:

1. A contact rail device for an at least partly electrically driven motor vehicle comprising:
    a plurality of busbars for electrical contact-connection of an electric machine to a supply device for the electric machine, wherein:
        each busbar comprises at least two compensation bows for compensation of temperature-dependent changes in length of the busbar,
        the plurality of busbars have different lengths and the at least two compensation bows are disposed at different positions along the length of the busbars with respect to the supply device, and
        the at least two compensation bows of each busbar is formed in an S-shape that comprises at least two oppositely oriented C-bows per busbar with a folded edge in between each of the at least two oppositely oriented C-bows.

2. The contact rail device as claimed in claim 1, wherein, for each busbar, the busbar and the at least two compensation bows are formed in one piece.

3. The contact rail device as claimed in claim 1, wherein each compensation bow is produced by at least one bending process.

4. The contact rail device as claimed in claim 1, wherein each busbar is manufactured from copper or a copper alloy.

5. The contact rail device as claimed in claim 1, wherein each busbar is of solid form.

6. The contact rail device as claimed in claim 1, wherein the supply device comprises an inverter device.

7. The contact rail device as claimed in claim 1, wherein the plurality of busbars comprises three busbars, wherein the three busbars each provide an electrical contact-connection for a respective phase of the electric machine.

8. The contact rail device as claimed in claim 1, wherein a length dimension of each busbar extends in a direction between the electric machine and the supply device for the electric machine.

9. A motor vehicle, which is at least partly electrically driven, comprising an electric machine and a supply device for the electric machine and a contact rail device having a plurality of busbars for electrical contact-connection of the electric machine to the supply device, wherein:
    each busbar comprises at least one compensation bow for compensation of temperature-dependent changes in length,
    the plurality of busbars have different lengths and the at least two compensation bows are disposed at different positions along the length of the busbars with respect to the supply device, and
    the at least two compensation bows of each busbar is formed in an S-shape that comprises at least two oppositely oriented C-bows per busbar with a folded edge in between each of the at least two oppositely oriented C-bows.

* * * * *